(12) United States Patent
Herringshaw et al.

(10) Patent No.: US 9,338,941 B2
(45) Date of Patent: May 17, 2016

(54) SELF CLEARING CROP RAMP (71) Applicant: DEERE & COMPANY, Moline, IL (US)

(72) Inventors: Brian Herringshaw, Bettendorf, IA (US); Joshua Pierson, Davenport, IA (US); Anthony M Hasenour, East Moline, IL (US); Jesse R Neely, Annawan, IL (US); Ladarius D Agee, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 130 days.

(21) Appl. No.: 13/933,758

(22) Filed: Jul. 2, 2013

(65) Prior Publication Data

US 2015/0007544 A1    Jan. 8, 2015

(51) Int. Cl.
*A01D 43/00* (2006.01)
*A01D 34/40* (2006.01)

(52) U.S. Cl.
CPC ...................................... *A01D 34/40* (2013.01)

(58) Field of Classification Search
CPC .............................. A01D 61/002; A01D 34/40
USPC ................................................. 56/181, 320.2
See application file for complete search history.

(56) References Cited

U.S. PATENT DOCUMENTS

| | | | | |
|---|---|---|---|---|
| 4,757,671 A | * | 7/1988 | McConnell | 56/50 |
| 5,209,053 A | * | 5/1993 | Verbeek | 56/298 |
| 5,459,986 A | * | 10/1995 | Talbot et al. | 56/181 |
| 6,116,010 A | * | 9/2000 | Salley | 56/257 |
| 6,351,931 B1 | * | 3/2002 | Shearer | 56/181 |
| 7,886,512 B2 | * | 2/2011 | Lohrentz et al. | 56/181 |
| 7,921,627 B2 | | 4/2011 | Sauerwein et al. | |
| 7,975,462 B1 | * | 7/2011 | Figgins | 56/181 |
| 8,322,520 B2 | | 12/2012 | Dow et al. | |
| 8,341,929 B2 | | 1/2013 | Sauerwein et al. | |
| 8,511,050 B1 | * | 8/2013 | Cormier et al. | 56/181 |
| 2008/0202090 A1 | * | 8/2008 | Lovett et al. | 56/208 |
| 2013/0291506 A1 | * | 11/2013 | Johnson et al. | 56/12.8 |
| 2014/0237975 A1 | * | 8/2014 | Walker | 56/113 |

FOREIGN PATENT DOCUMENTS

EP            0717922 B1    8/1999

* cited by examiner

*Primary Examiner* — Thomas B Will
*Assistant Examiner* — Mai Nguyen (57) ABSTRACT

A crop ramp (112) for an agricultural harvesting head (100) has a forward portion (212) that is generally planar and has a leading edge (200) that is configured to be fixed the rear of a reciprocating knife (110) and ahead of a leading edge (202) of a conveyor belt of the conveyor (104, 106); and a rear portion (214) that is generally planar and that is fixed to and extends rearward from the forward portion (212), wherein the rear portion (214) is configured to extend over the leading edge (202) of an endless belt of the conveyor (104, 106), where the rear portion (214) has a lower surface (216) that is generally planar and is parallel to an upper surface of the endless belt of the conveyor (104, 106) and has a trailing edge (204), where at least one recess (218) extends into the lower surface (216), where a first end of the recess is upstream of the second end of the recess (218) and wherein the first end of the recess is farther from the trailing edge (204) than the second end.

19 Claims, 5 Drawing Sheets

SELF CLEARING CROP RAMP

FIELD OF THE INVENTION

This invention relates to agricultural harvesting equipment. More particularly, it relates to agricultural harvesting heads having reciprocating knives and conveyor belts. Even more particularly, it relates to crop ramps for conveying crop from the reciprocating knives to the conveyor belts.

BACKGROUND OF THE INVENTION

Agricultural harvesting machines, such as draper platforms, include a reciprocating knife disposed at the leading edge of the harvesting machine. These reciprocating knives are formed of an elongate bar to which many small knife blades are attached.

The reciprocating knife severs the crop plants at their roots permitting them to fall backward onto a conveyor belt. Typically, a crop ramp is provided that extends from the reciprocating knife, over the leading edge of the conveyor belt, and any gap between the knife the conveyor belt, and terminates on the upper surface of the conveyor belt.

The function of the crop ramp is to ensure that cut crop material is conveyed to the upper surface of the conveyor belt and does not fall into a gap or machinery between the reciprocating knife and the conveyor belt.

In recent years, draper platforms have been designed that permit the reciprocating knife and the conveyor belts to flex in order to more accurately follow the contours of the ground. In order to provide this flexure, crop ramps that extend across the entire width of the draper platform have been segmented into 50-100 shorter crop ramp segments.

Each crop ramp segment is typically about 10-20 cm wide. Each crop ramp segment overlaps adjacent crop ramp segments to reduce the possibility that cut crop material will become wedged into the spaces between adjacent crop ramps.

The crop ramp segments are typically made of plastic and rest lightly on the top surface of the conveyor belt, which is itself made of rubber-impregnated fabric.

One problem with this arrangement is that the crop ramps experience wear as they rub against the conveyor belts. Furthermore, as the draper platform flexes slight gaps will be created between the upper surface of the conveyor belt and the crop ramps that extend over the leading edge of the conveyor belt.

These gaps and wear on the crop ramps permit cut crop material to become inserted between the crop ramp and the upper surface of the conveyor belt. This material, once it is inserted into the gap, often gathers forming large clots or knots of rolled up crop material. These large clots or knots create permanent gaps between the crop ramp and the upper surface of the conveyor belt, that in turn permit even more cut crop material to make its way into the space.

Eventually, the farmer has to stop harvesting crops, climb down from his cab, walk around to the front of the draper platform, individually flex each crop ramp segment upward, and manually remove the knots or bunches of cut crop material wedged between the crop ramp and the upper surface of the conveyor belt.

Furthermore, the knots of rolled up crop material will wear away the upper surface of the conveyor belt, causing it to fail prematurely.

What is needed, therefore, is a new crop ramp segment that will reduce the amount of cut crop material that becomes wedged between the crop ramp segment and the upper surface of the conveyor belt by providing structures on the crop ramp that tend to clear or remove any cut crop material that manages to find its way between the crop ramp segment and the upper surface of the conveyor belt.

It is an object of this invention to provide such a new crop ramp segment.

SUMMARY OF THE INVENTION

In accordance with one aspect of the invention, a crop ramp for an agricultural harvesting head is provided which comprises a plurality of side-by-side mounted crop ramp segments, the agricultural harvesting head having a frame, a reciprocating knife extending across the agricultural harvesting head and supported on the frame, and a conveyor having an endless belt and extending across the agricultural harvesting head and supported on the frame for conveying crop laterally, each crop ramp segment comprising: a forward portion that is generally planar and has a leading edge that is configured to be fixed the rear of a reciprocating knife and ahead of a leading edge of a conveyor belt of the conveyor; and a rear portion that is generally planar and that is fixed to and extends rearward from the forward portion, wherein the rear portion is configured to extend over the leading edge of the endless belt of the conveyor, and has a lower surface that is generally planar and is parallel to the upper surface of the endless belt of the conveyor when the crop ramp segment is fixed to the agricultural harvesting head and further wherein the rear portion has a trailing edge, wherein at least one recess or channel extends into the lower surface, with the lower surface bounding opposite sides of the at least one recess or channel, wherein the at least one recess has a first end and a second end, wherein the first end is upstream of the second end, as considered relative to the direction crop is moved by the endless belt of the conveyor, and wherein the first end is farther from the trailing edge than the second end.

The at least one recess may be straight. The at least one recess may be disposed at an acute angle with respect to the trailing edge. The at least one recess may extend over substantially the entire width of the lower surface. The at least one recess may have a constant width over substantially its entire length. The at least one recess may curve toward the trailing edge over substantially its entire length. The at least one recess may include at least three recesses, and each of the at least three recesses may have a first end and a second end and the first end of each of the at least three recesses may be laterally disposed at a location different from the other first ends. The second end of each of the at least three recesses may be laterally disposed at a location different from the other second ends. The at least one recess may be wavy along its length. The at least one recess may include at least three recesses, and all of the at least three recesses may be parallel to each other. The at least one recess may define a continuous arc over substantially its entire length. The at least one recess may have a first end configured to be disposed immediately adjacent to the leading edge of the conveyor belt covered by the rear portion of the ramp segment. The at least one recess may extend across substantially an entire width, as considered from front to rear, of a portion of the conveyor belt that is covered by the crop ramp segment.

The area of the at least one recess may be at least 10% of the total area of the lower surface. The area of the at least one recess may be at least 20% of the total area of the lower surface. The area of the at least one recess may be at least 40% of the total area of the lower surface. The area of the at least one recess may be no more than 60% of the total area of the lower surface. The crop ramp segment may be a unitary thermoplastic body.

In accordance with another aspect of the invention, an agricultural harvesting head is provided that comprises a frame that extends laterally; a reciprocating knife that is elongate, that extends laterally and that is supported on the frame; a conveyor that is supported on the frame, wherein the conveyor comprises a conveyor belt that is driven in a lateral direction, the conveyor belt having a leading edge that extends parallel to a longitudinal extent of the reciprocating knife; and a crop ramp segment described herein.

DETAILED DESCRIPTION

The term "side-to-side", "sideways", "laterally" or "lateral" refer to a direction that is horizontal and generally parallel to the longitudinal extent of the reciprocating knife and the agricultural harvesting head itself. This direction is perpendicular to a direction of travel "V" of the machine as it travels through the field harvesting crops. The terms "in front of", "front", "forward", "fore" and the like refer to the direction of travel "V". The terms "back", "rear", "behind", "to the rear of" and the like refer to a direction opposite to the direction of travel "V".

In the discussion below, crop ramp segments disposed in front of the left side conveyor are described and illustrated. Crop ramp segments disposed in front of the right side conveyor are identically constructed but in mirror image form. Further, the function and operation of the crop ramp segments in front of the right side conveyor are identical to the crop ramp segments in front of the left side conveyor. A separate description of the crop ramp segments in front of the right side conveyor is therefore omitted.

Figure 1:
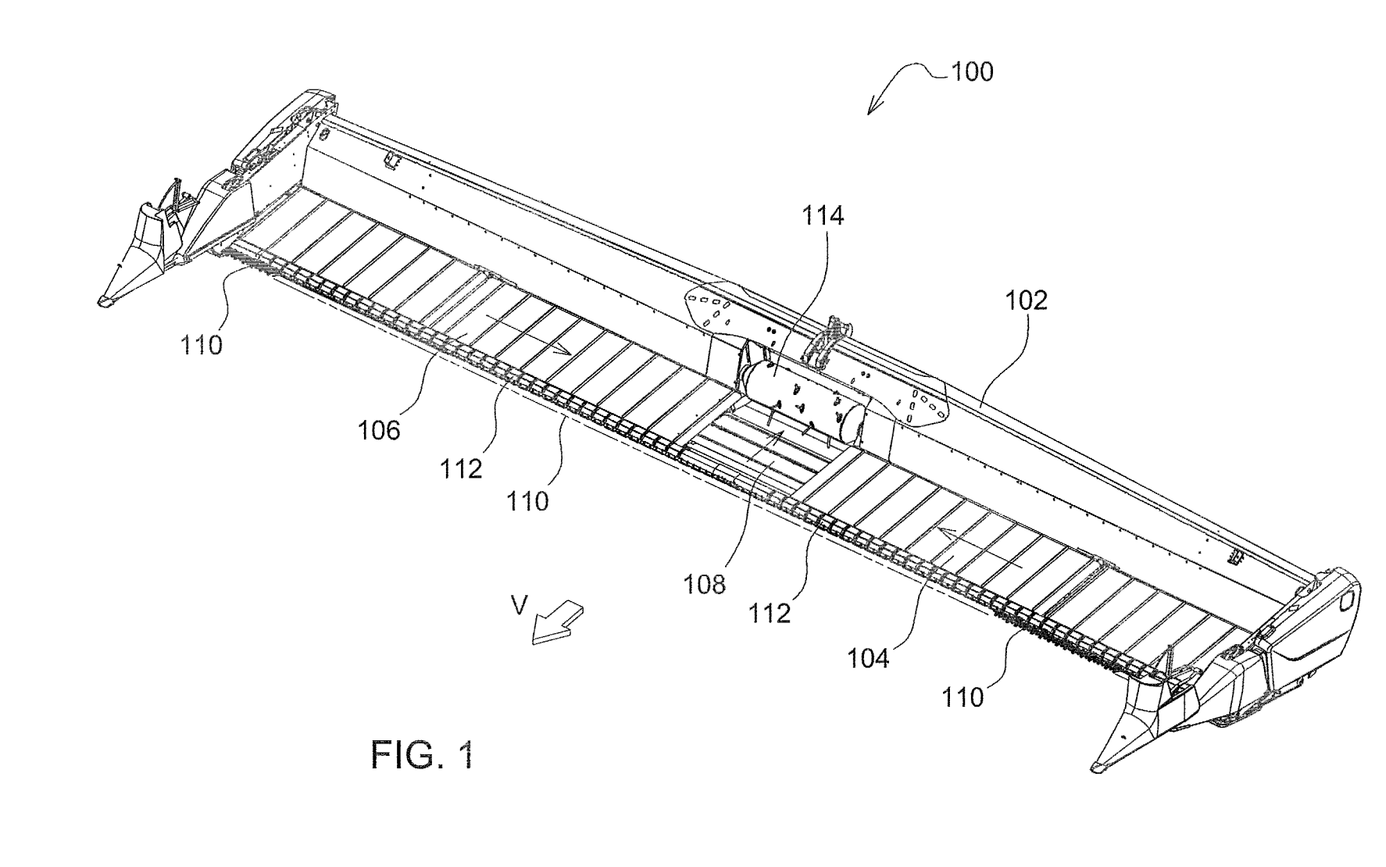
FIG. 1 is a perspective view of an agricultural harvesting head in accordance with the present invention.

FIG. 1 illustrates an agricultural harvesting head 100 in accordance with the present invention. The agricultural harvesting head 100 comprises a frame 102, a left side conveyor 104, right side conveyor 106, a center conveyor 108, a reciprocating knife 110, a plurality of crop ramp segments 112, and a feed drum 114.

The frame 102 supports the left side conveyor 104, the right side conveyor 106, the center conveyor 108, the reciprocating knife 110, the plurality of crop ramp segments 112, and the feed drum 114.

The frame 102 extends across substantially the entire width of the agricultural harvesting head 100.

The reciprocating knife 110 is disposed across substantially the entire width of the agricultural harvesting head 100. It is configured to sever crop plants at their roots thereby freeing them from the ground and permitting them to fall onto the left side conveyor 104, the right side conveyor 106, and the center conveyor 108.

The plurality of crop ramp segments 112 extend across substantially the entire width of the agricultural harvesting head 100. The plurality of crop ramp segments 112 direct the flow of cut crop plants upward and rearward across the leading edge of the left side conveyor 104, and the right side conveyor 106.

The plurality of crop ramp segments 112 is comprised of many crop ramp segments 112. Approximately 70 crop ramp segments are shown in FIG. 1. Each crop ramp segment 112 engages its two adjacent crop ramp segments 112 such that altogether they provide a continuous upper crop ramp surface that extends across substantially the entire width of the agricultural harvesting head 100.

The left side conveyor 104 is driven by motors (not shown) and supported on rollers (not shown) in a conventional manner to carry crop on the upper surface of the conveyor belt of the left side conveyor 104 to the right and toward the center conveyor 108 as indicated by the crop flow arrow superimposed on top of the left side conveyor 104.

The right side conveyor 106 is driven by motors (not shown) and supported on rollers (not shown) in the conventional manner to carry crop on the upper surface of the conveyor belt of the right side conveyor 106 to the left and toward the center conveyor 108 as indicated by the crop flow arrow superimposed on top of the right side conveyor 106.

The center conveyor 108 is driven by motors (not shown) and supported on rollers (not shown) in the conventional manner to carry crop deposited on the upper surface of the belt of the center conveyor 108 rearward and underneath the feed drum 114. The agricultural harvesting head 100 is supported on a feederhouse (not shown) on the front of an agricultural combine (not shown). The feederhouse is disposed to receive cut crop material passing underneath the feed drum 114 and on top of the belt of the center conveyor 108 and to transmit the cut crop material into the agricultural combine for further processing and storage.

Figure 2:
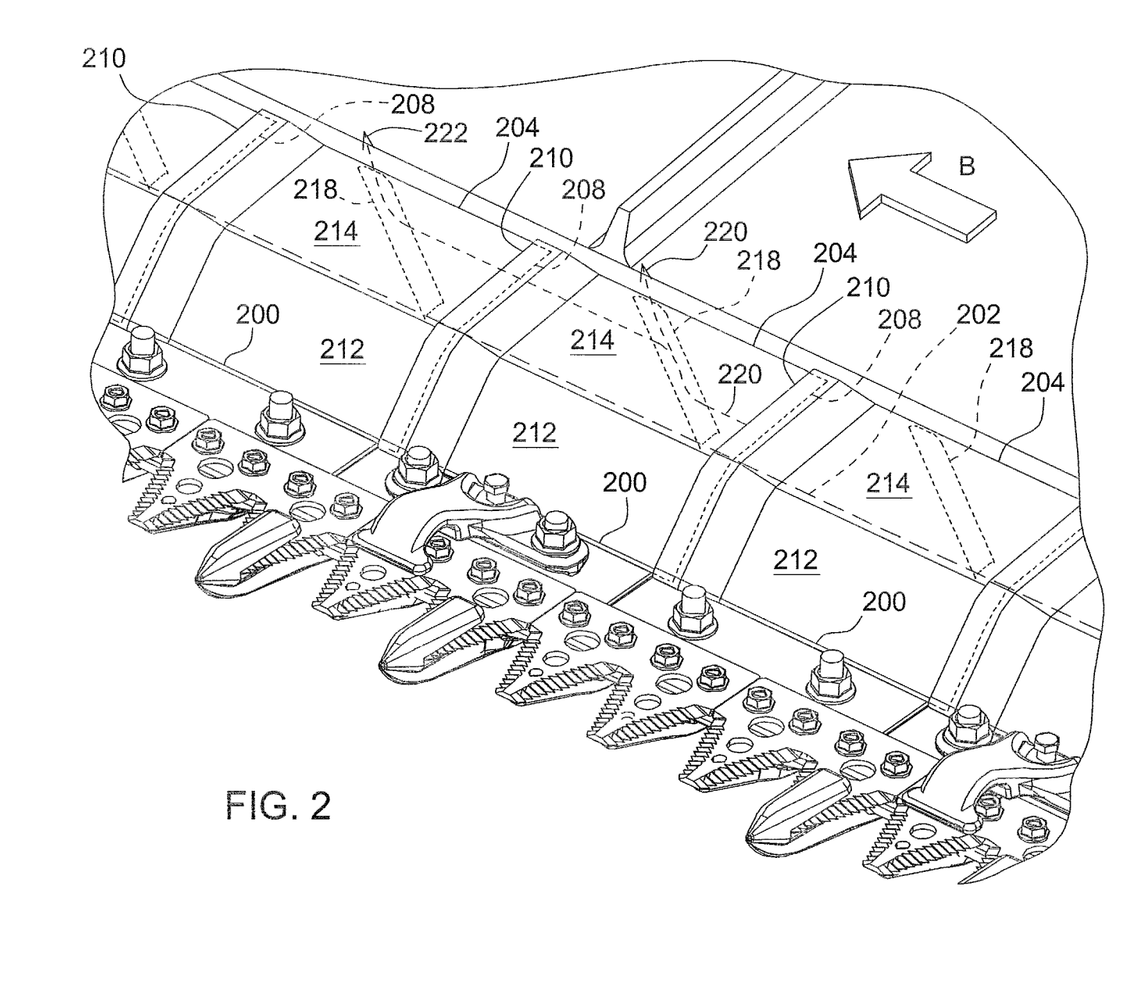
FIG. 2 is a fragmentary detail perspective view of the agricultural harvesting head of FIG. 1.
Figure 3:
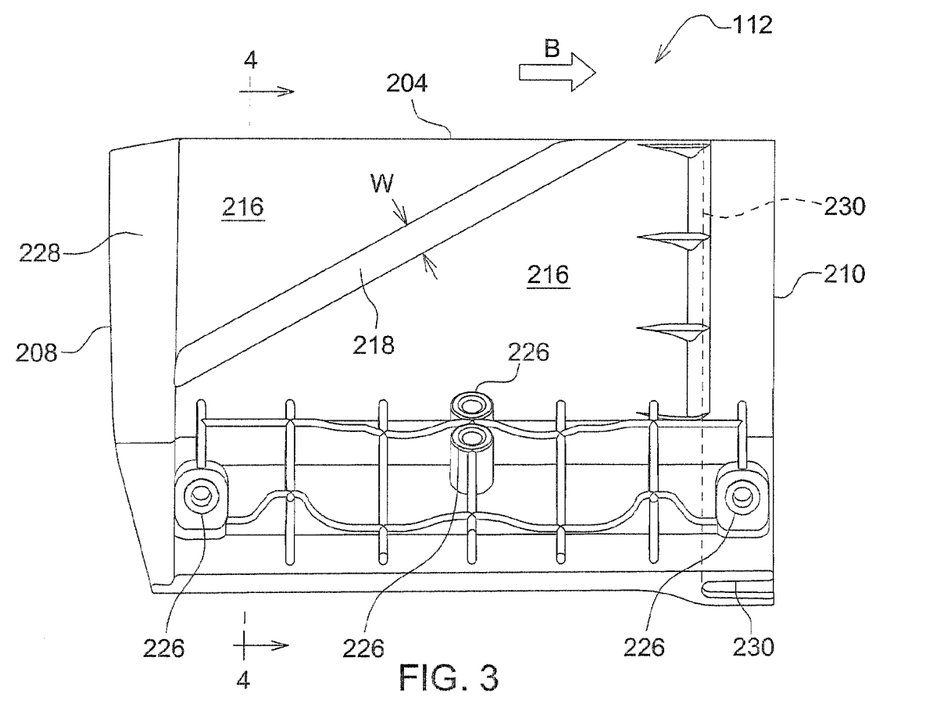
FIG. 3 is bottom view of one of the crop ramp segments shown in FIGS. 1-2.
Figure 4:
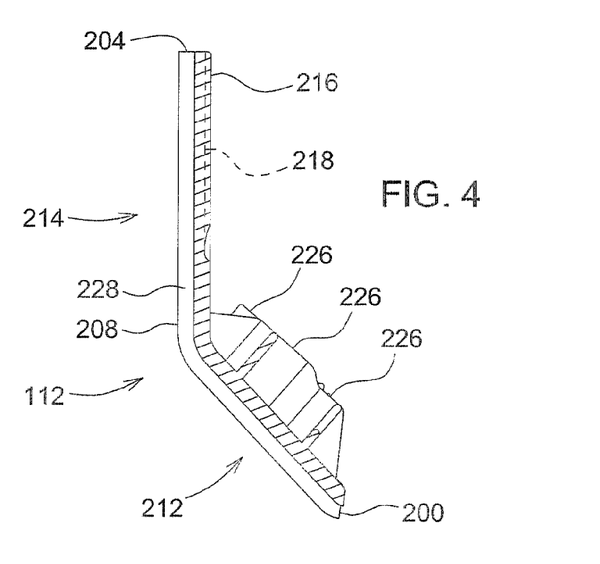
FIG. 4 is a cross-sectional side view of the crop ramp segment of FIG. 3 taken at section line 4-4 in FIG. 3.

In FIG. 2, several crop ramp segments 112 are shown together with the left side conveyor 104 and the reciprocating knife 110. In FIGS. 3-4 one of the crop ramp segments 112 is illustrated. The other crop ramps of the agricultural harvesting head 100 are identically constructed.

The upper surface of each crop ramp segment 112 has a leading edge 200 that abuts a rear portion of the reciprocating knife 110. The leading edge 200 is located in front of a the leading edge 202 of the conveyor belt of the left side conveyor 104.

Each crop ramp segment 112 has a trailing edge 204 that is disposed above the upper surface 206 of the conveyor belt of the left side conveyor 104. The trailing edge 204 extends generally parallel to the direction of travel "B" of the conveyor belt of the left side conveyor 104. Similarly, the leading edge 200 extends generally parallel to the direction of travel "B" of the conveyor belt of the left side conveyor.

Each crop ramp segment 112 has an upstream edge 208 that is engaged with a downstream edge 210 of the crop ramp segment 112 located adjacent to and immediately upstream (with respect to the direction of travel "B") of said each crop ramp segment 112.

Each crop ramp segment 112 has a forward portion 212 that is generally planar and upwardly inclined (in a front-to-rear direction) in order to guide the cut crop material upward and onto the conveyor belt of the left side conveyor 104. The leading edge 200 defines the forward edge of the forward portion 212, with the forward portion 212 having a rear region that terminates above and adjacent to the leading edge 202 of the conveyor belt of the left side conveyor 104.

Each crop ramp segment 112 has a rear portion 214 that is coupled to the forward portion 212, is generally planar, and extends rearward over the leading edge 202 of the conveyor belt of the left side conveyor 104, wherein the plane defined by the rear portion 214 is generally parallel to the upper surface of the conveyor belt of the left side conveyor 104.

The rear portion 214 has a lower surface 216 that is generally planar and parallel to the upper surface of the conveyor belt of the left side conveyor 104. The lower surface 216 faces downward and, except for a recess or channel 218 (described more fully below) formed therein, abuts the upper surface of the conveyor belt of the left side conveyor 204. The lower surface 216 covers the leading portion of the conveyor belt of the left side conveyor 204.

The lower surface 224 of the forward portion 212 has several bosses 226 that extend downward therefrom. The bosses 226 have apertures that are configured to receive removable fasteners, such as screws or bolts. The removable fasteners (not shown) are inserted upward through corresponding through-holes formed in a stationary cutter bar that is immediately behind the reciprocating portions of the reciprocating knife 110, and are threaded into the apertures. In this manner, each crop ramp segment 112 is fixed to the reciprocating knife 110 and held in position with respect to its two adjacent crop ramp segments 112 such that the leading edge 200 is behind the blades of the reciprocating knife.

Each crop ramp segment 112 is coupled to the adjacent crop ramp segments with a tongue and groove arrangement. Each crop ramp segment 112 has an upstream projecting tongue 228 that terminates in the edge 208 and is received into a corresponding groove 230 of a first adjacent crop ramp segment 112. Likewise, each crop ramp segment 112 has a groove 230 formed into the downstream edge 210 into which the upstream projecting tongue 228 of a second adjacent crop ramp segment 112 is inserted.

The tongue 228 extends across substantially the entire length of the crop ramp segment 112 from the leading edge 200 to the trailing edge 204. The groove 230 extends across substantially the entire length of the crop ramp segment 112 from the leading edge 200 to the trailing edge 204.

The recesses or channels 218 are provided on the lower surface 216 of the crop ramp segment 112 to receive and steer particles of cut crop material rearward. The steering is effectuated by the angle of the recesses with respect to the direction of travel of the conveyor belt of the left side conveyor 104 with respect to the lower surface 216.

Referring to FIGS. 2-3, each recess 218 has a first end that is located upstream of a second end. The first end is disposed at the leading edge 202 of the conveyor belt. The second end is disposed at the trailing edge 204 of the crop ramp segment 112. Thus, the recess 218 extends across substantially the entire width of the portion of the conveyor belt that is covered by the crop ramp segment 112. The arrangement is similar in FIG. 5, in FIG. 7, and the same for at least two of the recesses 218 shown in FIG. 8.

Due to its planar arrangement, the lower surface 216, with the exception of the recess or channel 218, contacts the upper surface of the conveyor belt with a substantially even and slight contact force across substantially its entire extent. The recess 218 extends upwardly (in FIG. 2) into the lower surface 216, thereby providing a space between the surface of the recess 218 and the upper surface of the conveyor belt of the left side conveyor 204. Nonetheless, a substantial portion of the lower surface 216 abuts the upper surface of the conveyor belt of the left side conveyor 104 and distributes the force applied by the conveyor belt over a relatively wide area.

In the embodiment of FIG. 2 (also FIGS. 3-4), for example, particles of cut crop material tend to follow the path shown by the dashed arrow 220. Particles that may have been lodged underneath the rear portion 214 between the rear portion and the upper surface of the conveyor belt will be moved by the conveyor belt until they enter the recess 218.

Having entered the recess 218, the continued movement of the conveyor belt will tend to generate a rolling motion of the particles within the recess 218. This rolling motion of the particles will gather them and convey them along the length of the interior of the recess 218 until they exit the recess 218 and are released rearwardly from between the crop ramp segment 112. This path is shown by the dashed arrow 220.

Not every particle of cut crop material trapped between the crop ramp segment 112 and the upper surface of the conveyor belt of the left side conveyor 104 will be removed by a single recess 218. Some of the particles are moved only partially rearward along the recess 218. These particles are dragged out of the recess 218 by the action of the conveyor belt and carried downstream (i.e. generally parallel to the direction "B") until they reach the next recess 218 downstream. At which point, the action of the next downstream recess will then carry them rearward and out from between the crop ramp segment 112. This is indicated by the path of dashed arrow 222. Indeed, any particle of cut crop material trapped between the lower surface 216 and the conveyor belt of the left side conveyor 104 may pass into and out of many recesses 218 in succession before it is carried rearward and ejected from between the lower surface 216 and the conveyor belt of the left side conveyor 104.

In the embodiment of the crop ramp segment 112 illustrated in FIGS. 1-4, the crop ramp has a single recess or channel 218. The recess 218 extends across substantially the entire lateral width of the crop ramp segment 112. The recess 218 is straight, and is disposed at an acute angle with respect to the trailing edge 204 of the crop ramp segment 112. The recess 218 extends over substantially the entire width of the lower surface 216, from a first end that is adjacent the front left corner (in FIG. 3) of the lower surface 216 to a second end at the rear right corner (in FIG. 3) of the lower surface 216. The recess 218 has a constant width over substantially its entire length. A first end (the upstream end) of the recess 218 is disposed immediately adjacent to a forward end region of the lower surface 216, and, hence, immediately adjacent to the leading edge 202 of the portion of the conveyor belt contacted by the lower surface 216. A second end (the downstream end) of the recess is disposed immediately adjacent to the trailing edge 204 of the ramp segment 112.

A significant planar portion of the lower surface 216 remains even after the recess 218 is formed in the lower surface 216. In the embodiment of FIGS. 1-4, the area of the recess (best shown in FIG. 3) constitutes only 13% of the total area of the lower surface 216. Thus, 87% of the lower surface of 216 remains planar, and provides a even planar supporting surface against which the upper surface of the conveyor belt of the left side conveyor 104 can easily slide.

Due to the sizable planar area of lower surface 216 that remains after the formation of the recess 218, friction between the upper surface of the conveyor belt of the left side conveyor 104 and the lower surface 218 does not damage (or only causes minor damage to) the conveyor belt and to the lower surface 216.

In FIGS. 5-8, alternative crop ramp segments 112 are shown that are identical in all respects to the crop ramp segment 112 of FIGS. 1-4, differing only in the location shape, form, and placement of a recess or recesses 218.

Figure 5:
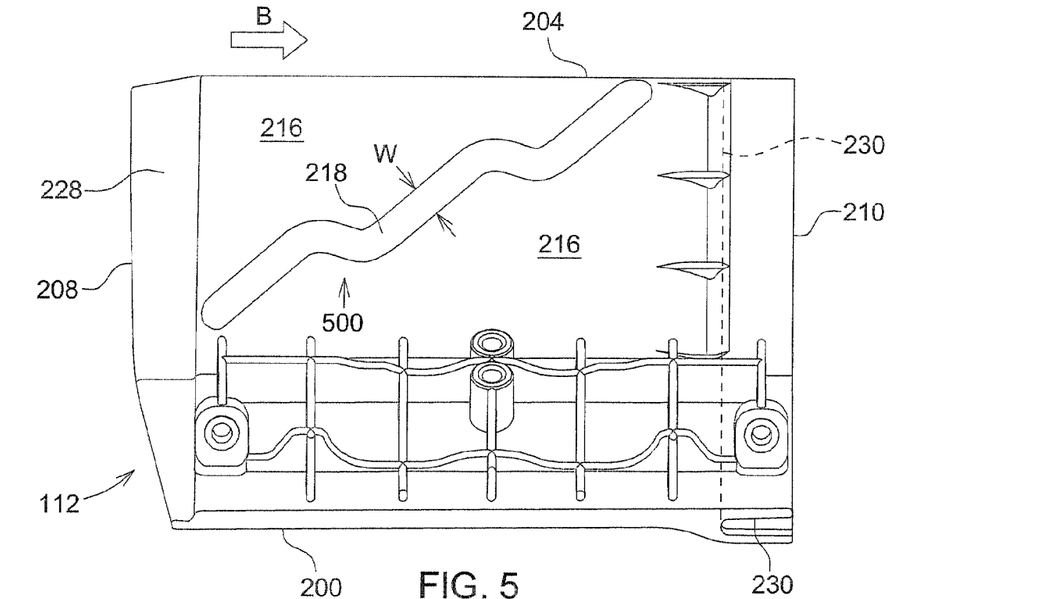
FIGS. 5-8 are bottom views of alternative crop ramps in accordance with the present invention.

In FIG. 5, an alternative crop ramp segment 112 is disclosed in which a recess 218 is provided that that is wavy, curved, and undulates back and forth over substantially its entire length, and consequently, is not disposed at a constant angle with respect to the trailing edge 204 over its entire length. This arrangement can be beneficial in releasing particles of cut crop material that may have passed into and then through the recess 218 and become reinserted between the lower surface 216 and the upper surface of the conveyor belt of the left side conveyor 104. A first end (the upstream end) of the recess 218 is disposed immediately adjacent to the leading edge 202. A second end (the downstream end) of the recess is disposed immediately adjacent to the trailing edge 204.

In this arrangement, the area of the recess 218 constitutes only 15% of the total area of the lower surface 216, thus leaving 85% of the lower surface 216 in planar form to support the conveyor belt of left side conveyor 104.

Figure 6:
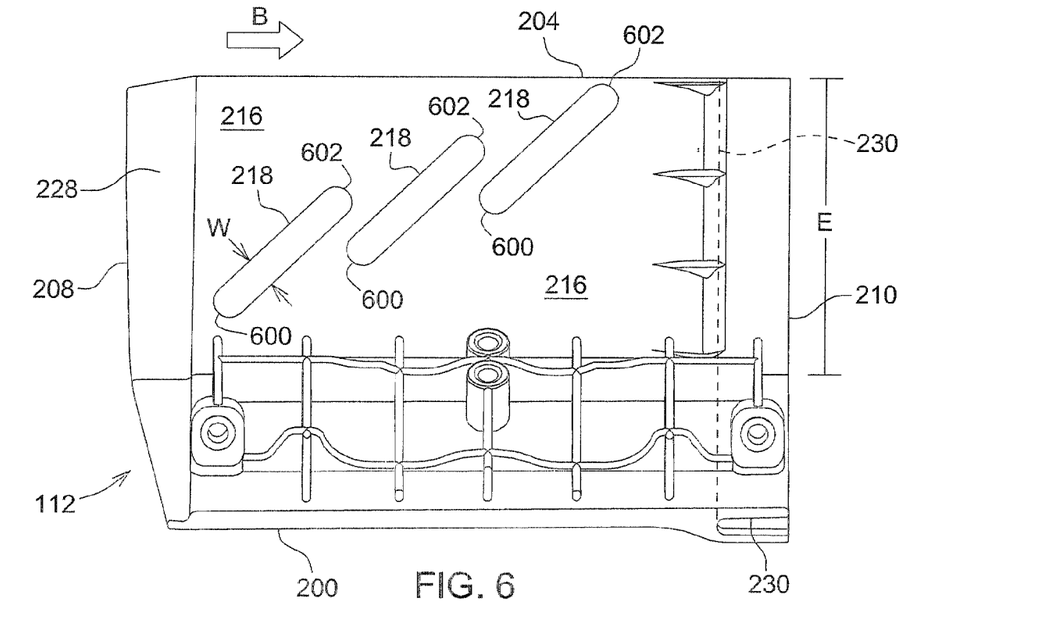

In FIG. 6, an alternative crop ramp segment 112 is disclosed in which three recesses 218 are provided. In this arrangement, the three recesses 218 are staggered, and have a first end 600 and a second end 602 that are offset from the first end 600 and the second ends 602 of the adjacent recesses 218. Each of the recesses 218 has a length less than the entire front to back extent "E" of the rear portion 214. All three of the recesses are straight. The first end 600 of all three recesses 218 is farther from the trailing edge 204 than the second end 602. All of the recesses 218 are parallel to each other. All of the recesses 218 have the same length. Each successive recess 218 going from upstream to downstream (i.e. going in the direction "B") is successively closer to the trailing edge 204. Each successive first end 600 is closer to the trailing edge. Each successive second end 602 is closer to the trailing edge. Each of the recesses 218 has a constant width over substantially the entire length of the recess 218.

In this arrangement, the total area of the three recesses 218 constitute only 15% of the total area of the lower surface 216, thus leaving 85% of the lower surface 216 in planar form to support the conveyor belt of the left side conveyor 104.

Figure 7:
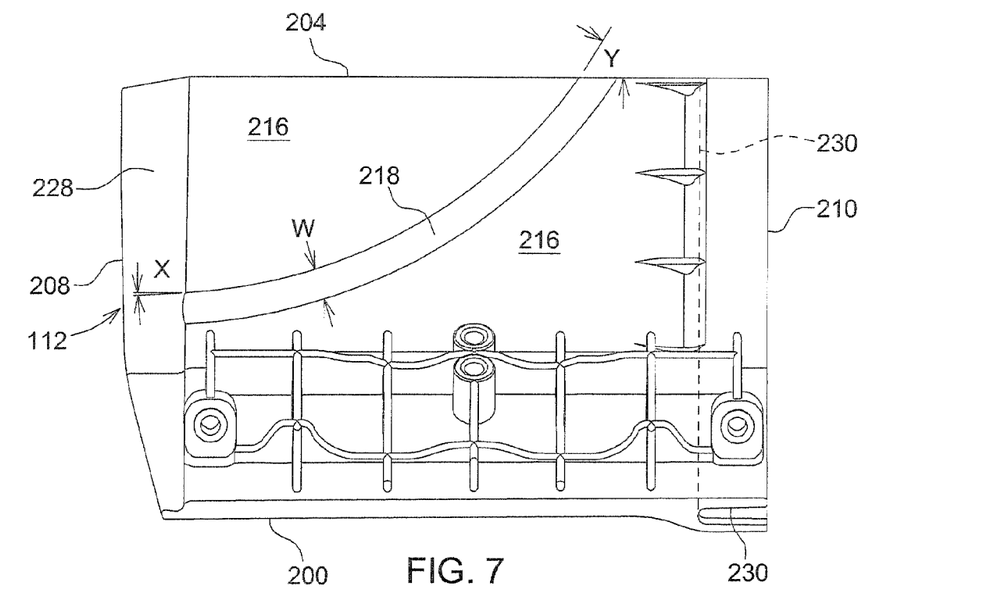

In FIG. 7, an alternative crop ramp segment 112 is disclosed in which a single recess 218 is provided that curves upwardly toward the trailing edge 204 over substantially its entire length from an upstream end to a downstream end. In this arrangement, the upstream end of the recess 218 is adjacent a fore-and-aft extending inner side of the ramp segment tongue 228 and is disposed at a first angle "X" with respect to the trailing edge 204 and the downstream end of the recess 218 is adjacent the trailing edge 204 and is disposed at a second angle "Y" with respect to the trailing edge 204 that is greater than the first angle "X". In this arrangement, the angle of the recess 218 with respect to the trailing edge 204 changes (i.e. increases) continuously over substantially the entire length of the recess 218 from the upstream end to the downstream end. The recess 218 has a constant width over substantially the entire length of the recess 218. A first end (the upstream end) of the recess 218 is disposed immediately adjacent a forward portion of the generally planar lower surface 116 of the rear portion of the ramp segment 112 and, thus, immediately adjacent to the leading edge 202 of the conveyor belt of the left side conveyor 104. A second end (the downstream end) of the recess is disposed immediately adjacent to the trailing edge 204.

In this arrangement, the total area of the recess 218 constitutes only 15% of the total area of the lower surface 216, thus leaving 85% of the lower surface 216 in planar form to support the conveyor belt of the left side conveyor 104.

Figure 8:
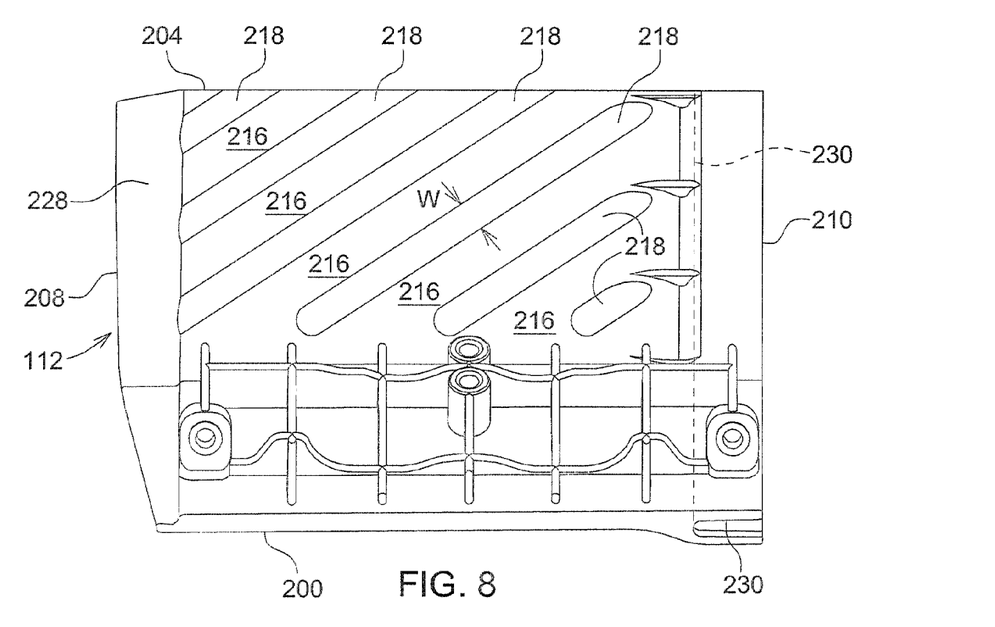

In FIG. 8, an alternative crop ramp segment 112 is disclosed in which six recesses 218 are provided. In this arrangement, the six recesses 218 are spaced equidistantly apart. They are all straight recesses without bends or undulations along their length. Further, the six recesses 218 are distributed evenly across substantially the entire portion of lower surface 216 that would otherwise contact the upper surface of the conveyor belt of the left side conveyor 104. All of the recesses 218 are straight. All of the recesses 218 have a constant width. All of the recesses 218 are parallel to each other. All of the recesses 218 are at a constant acute angle with respect to the trailing edge 204. A first end (the upstream end) of the rightmost recesses 218 is disposed immediately adjacent to the leading edge 202. A second end (the downstream end) of the four leftmost recesses 218 is disposed immediately adjacent to the trailing edge 204. The two central recesses 218 have both the first end that is disposed immediately adjacent to the leading edge 202 and the second in that is disposed immediately adjacent to the trailing edge 204.

In the embodiment of FIG. 8, the total area of the six recesses 218 constitute 40% of the total area of the lower surface 216, thus leaving 60% of the lower surface 216 with planar form. The 60% portion of the lower surface 216 in planar form supports the conveyor belt of the left side conveyor 104. In the previous arrangements of FIGS. 1-7, the size of the recess (or recesses) 218 to the planar portion of the lower surface 216 was 13-15%.

It is beneficial if the total area of the recess (or recesses) 218 is at least 10% of the total area of the lower surface 216. This may not, however, provide optimum clearing of cut crop material that becomes inserted between the lower surface 216 and the upper surface of the conveyor belt of the left side conveyor 104, however.

In another arrangement, the total area of the recess (or recesses) 218 is at least 20% of the total area of the lower surface 216. This will provide better clearing of cut crop material between the lower surface 216 and the upper surface of the conveyor belt of the left side conveyor 104.

In yet another arrangement, the total area of the recess (or recesses) 218 is at least 30% of the total area of the lower surface 216. This will provide better clearing of cut crop material in crops that are particularly fragmented.

In yet another arrangement, shown for example in FIG. 8, the total area of the recess (or recesses) 218 is at least 40% of the total area of the lower surface 216. This allows closer spacing of adjacent recesses 218, and thus quicker clearing of cut crop material between the lower surface 216 and the upper surface of the conveyor belt of left side conveyor 104.

Frictional heat is a problem for crop ramp segments 112 that are formed of thermoplastics. When the crop ramp segment 112 is formed of a thermoplastic the total area of the recess (or recesses) 218 is preferably not greater than 60% of the total area of the lower surface 216, which would leave 40% of the total area of the lower surface 216 in planar form to provide support for the conveyor belt of the left side conveyor 104. This should be sufficient to prevent excessive frictional wear of both the lower surface 216 and the upper surface of the conveyor belt of the left side conveyor 104.

It should be understood that the particular embodiments shown and discussed herein are not the only ways in which the invention can exist. They are the currently preferred embodiments of the invention. One skilled in the art of agricultural harvester and agricultural harvesting head design and manufacture can readily see other variations that would also fall within the scope of the appended claims.

For example, all of the recesses or channels 218 that appear have a constant width "W" over their entire length. In an alternative arrangement, the recesses 218 can have a variable width over their length. Furthermore, in embodiments having multiple recesses 218, each of the recesses 218 has the same width "W". In an alternative arrangement, multiple recesses 218 on a single crop ramp segment 112 can have different widths.

We claim:

1. A crop ramp segment (112) arranged in side-by-side relationship with a plurality of ramp segments (112) to form a crop ramp for an agricultural harvesting head (100) having a direction of travel (V), the agricultural harvesting head (100) having a frame (102), a reciprocating knife (110) extending across the agricultural harvesting head and supported on the frame (102), and a conveyor (104, 106, 108) having an endless belt and extending across the agricultural harvesting head (100) and supported on the frame (102), each crop ramp segment having, with respect to a crop conveying direction of travel (B) of the endless belt, opposite lateral sides respectively including upstream and downstream edges (208, 210) extending in the direction of travel (V), with each crop ramp segment further comprising:

a forward portion (212) that is generally planar, is configured to be located ahead of a leading edge (202) of the endless belt of the conveyor (104, 106) and has a leading edge (200) that is configured to be fixed to a rear of a reciprocating knife (110); and    a rear portion (214) that is generally planar and that is fixed to and extends rearward from the forward portion (212), wherein the rear portion (214) is configured to extend over the leading edge (202) of the endless belt of the conveyor (104, 106), and has a lower surface (216) that is generally planar and is parallel to an upper surface of the endless belt of the conveyor (104, 106) when said crop ramp segment (112) is fixed to the agricultural harvesting head (100) and further wherein the rear portion has a trailing edge (204),    wherein at least one recess (218) extends into the lower surface (216) with co-planar portions of the lower surface (216) bounding opposite sides of said at least one recess, wherein the at least one recess (218) has a first end and a second end,    wherein the first end is upstream of the second end and wherein the first end is farther from the trailing edge than the second end.

2. The crop ramp segment (112) of claim 1, wherein the at least one recess (218) is straight.

3. The crop ramp segment (112) of claim 1, wherein the at least one recess (218) is disposed at an acute angle with respect to the trailing edge (204).

4. The crop ramp segment (112) of claim 1, wherein the at least one recess (218) extends over substantially an entire distance between the upstream edge (208) and the downstream edge (210) of the lower surface (216).

5. The crop ramp segment (112) of claim 1, wherein the at least one recess (218) has a constant width over substantially its entire length.

6. A crop ramp segment (112) for an agricultural harvesting head (100), the agricultural harvesting head (100) having a frame (102), a reciprocating knife (110) extending across the agricultural harvesting head and supported on the frame (102), and a conveyor (104, 106, 108) having an endless belt including an upper surface and extending across the agricultural harvesting head (100) and supported on the frame (102), the crop ramp segment comprising:

a forward portion (212) that is generally planar and has a leading edge (200) that is configured to be fixed to a rear of a reciprocating knife (110) and ahead of a leading edge (202) of the endless belt of the conveyor (104, 106);

a rear portion (214) that is generally planar and that is fixed to and extends rearward from the forward portion (212), wherein the rear portion (214) is configured to extend over the leading edge (202) of the endless belt of the conveyor (104, 106), and has a lower surface (216) that is generally planar and is parallel to the upper surface of the endless belt of the conveyor (104, 106) when said crop ramp segment (112) is fixed to the agricultural harvesting head (100) and further wherein the rear portion has a trailing edge (204);

wherein the at least one recess (218) extends into the lower surface (216), wherein the at least one recess has a first end and a second end, wherein the first end is upstream of the second end and wherein the first end is farther from the trailing edge than the second end; and    wherein the at least one recess (218) curves toward the trailing edge (204) over substantially its entire length.

7. A crop ramp segment (112) for an agricultural harvesting head (100), the agricultural harvesting head (100) having a frame (102), a reciprocating knife (110) extending across the agricultural harvesting head and supported on the frame (102), and a conveyor (104, 106, 108) having an endless belt including an upper surface and extending across the agricultural harvesting head (100) and supported on the frame (102), the crop ramp segment comprising:

a forward portion (212) that is generally planar and has a leading edge (200) that is configured to be fixed to a rear of a reciprocating knife (110) and ahead of a leading edge (202) of the endless belt of the conveyor (104, 106); and    a rear portion (214) that is generally planar and that is fixed to and extends rearward from the forward portion (212), wherein the rear portion (214) is configured to extend over the leading edge (202) of the endless belt of the conveyor (104, 106), and has a lower surface (216) that is generally planar and is parallel to the upper surface of the endless belt of the conveyor (104, 106) when said crop ramp segment (112) is fixed to the agricultural harvesting head (100) and further wherein the rear portion has a trailing edge (204),    wherein at least one recess (218) extends into the lower surface (216), wherein the at least one recess has a first end and a second end, wherein the first end is upstream of the second end and wherein the first end is farther from the trailing edge than the second end, and    wherein the at least one recess (218) includes at least three recesses (218), wherein each of said at least three recesses (218) has a first end (600) and a second end (602), wherein the first end (600) of each of the at least three recesses (218) is laterally disposed at a location different from the other first ends (600).

8. The crop ramp segment (112) of claim 7, wherein the second end (602) of each of the at least three recesses (218) is laterally disposed at a location different from the other second ends (602).

9. A crop ramp segment (112) for an agricultural harvesting head (100), the agricultural harvesting head (100) having a frame (102), a reciprocating knife (110) extending across the agricultural harvesting head and supported on the frame (102), and a conveyor (104, 106, 108) having an endless belt including an upper surface and extending across the agricultural harvesting head (100) and supported on the frame (102), the crop ramp segment comprising:

a forward portion (212) that is generally planar and has a leading edge (200) that is configured to be fixed to a rear of a reciprocating knife (110) and ahead of a leading edge (202) of the endless belt of the conveyor (104, 106); and    a rear portion (214) that is generally planar and that is fixed to and extends rearward from the forward portion (212), wherein the rear portion (214) is configured to extend over the leading edge (202) of the endless belt of the conveyor (104, 106), and has a lower surface (216) that is generally planar and is parallel to the upper surface of the endless belt of the conveyor (104, 106) when said crop ramp segment (112) is fixed to the agricultural harvesting head (100) and further wherein the rear portion has a trailing edge (204), wherein at least one recess (218) extends into the lower surface (216), wherein the at least one recess has a first end and a second end, wherein the first end is upstream of the second end and wherein the first end is farther from the trailing edge than the second end, and wherein the at least one recess (218) is wavy along its length.

10. A crop ramp segment (112) for an agricultural harvesting head (100), the agricultural harvesting head (100) having a frame (102), a reciprocating knife (110) extending across the agricultural harvesting head and supported on the frame (102), and a conveyor (104, 106, 108) having an endless belt including an upper surface and extending across the agricultural harvesting head (100) and supported on the frame (102), the crop ramp segment comprising:

a forward portion (212) that is generally planar and has a leading edge (200) that is configured to be fixed to a rear of a reciprocating knife (110) and ahead of a leading edge (202) of the endless belt of the conveyor (104, 106); and a rear portion (214) that is generally planar and that is fixed to and extends rearward from the forward portion (212), wherein the rear portion (214) is configured to extend over the leading edge (202) of the endless belt of the conveyor (104, 106), and has a lower surface (216) that is generally planar and is parallel to the upper surface of the endless belt of the conveyor (104, 106) when said crop ramp segment (112) is fixed to the agricultural harvesting head (100) and further wherein the rear portion has a trailing edge (204), wherein at least one recess (218) extends into the lower surface (216), wherein the at least one recess has a first end and a second end, wherein the first end is upstream of the second end and wherein the first end is farther from the trailing edge than the second end, and wherein the at least one recess (218) includes at least three recesses (218), and wherein all of said at least three recesses (218) is parallel to each other.

11. A crop ramp segment (112) for an agricultural harvesting head (100), the agricultural harvesting head (100) having a frame (102), a reciprocating knife (110) extending across the agricultural harvesting head and supported on the frame (102), and a conveyor (104, 106, 108) having an endless belt including an upper surface and extending across the agricultural harvesting head (100) and supported on the frame (102), the crop ramp segment comprising:

a forward portion (212) that is generally planar and has a leading edge (200) that is configured to be fixed to a rear of a reciprocating knife (110) and ahead of a leading edge (202) of the endless belt of the conveyor (104, 106); and a rear portion (214) that is generally planar and that is fixed to and extends rearward from the forward portion (212), wherein the rear portion (214) is configured to extend over the leading edge (202) of the endless belt of the conveyor (104, 106), and has a lower surface (216) that is generally planar and is parallel to the upper surface of the endless belt of the conveyor (104, 106) when said crop ramp segment (112) is fixed to the agricultural harvesting head (100) and further wherein the rear portion has a trailing edge (204), wherein at least one recess (218) extends into the lower surface (216), wherein the at least one recess has a first end and a second end, wherein the first end is upstream of the second end and wherein the first end is farther from the trailing edge than the second end, and wherein the at least one recess (218) defines a continuous arc over substantially its entire length.

12. The crop ramp segment (112) of claim 1, wherein the first end of the at least one recess (218) is disposed immediately adjacent a rearward region of the forward portion 12121 of the crop ramp segment (112) with the first end thus being configured to be disposed immediately adjacent to the leading edge (202) of the endless belt of the conveyor (104, 106).

13. The crop ramp segment (112) of claim 1 wherein the at least one recess (218) extends across substantially an entire lateral width of a portion of the lower surface (216) of the crop ramp segment (112) provided for covering a forward portion of the endless belt, with the first end of the at least one recess (218) being adjacent a front, upstream corner of the lower surface (216) and with the second end of the recess (218) being adjacent a rear, downstream corner of the lower surface (216).

14. An agricultural harvesting head (100) comprising:

a frame (102) that extends laterally;

a reciprocating knife (110) that is elongate, that extends laterally and that is supported on the frame (102);

a conveyor (106, 104), that is supported on the frame (102), wherein the conveyor comprises a conveyor belt that is driven in a lateral direction, the conveyor belt having a leading edge (202) that extends parallel to a longitudinal extent of the reciprocating knife (110); and a crop ramp segment (112) in accordance with claim 1.

15. The crop ramp segment (112) of claim 1, wherein the area of the at least one recess (218) is at least 10% of a total area of the lower surface (216).

16. The crop ramp segment (112) of claim 1, wherein the area of the at least one recess (218) is at least 20% of a total area of the lower surface (216).

17. The crop ramp segment (112) of claim 1, wherein the area of the at least one recess (218) is at least 40% of a total area of the lower surface (216).

18. The crop ramp segment (112) of claim 1, wherein the area of the at least one recess (218) is no more than 60% of a total area of the lower surface (216).

19. The crop ramp segment (112) of claim 1, wherein the crop ramp segment (112) is a unitary thermoplastic body.

* * * * *